May 27, 1941. W. D. BALCOM 2,243,665
FEEDER AND DISTRIBUTOR FOR CONVEYERS
Filed April 13, 1939 2 Sheets-Sheet 1

INVENTOR.
WILLIAM D. BALCOM.
BY
ATTORNEY.

May 27, 1941.  W. D. BALCOM  2,243,665
FEEDER AND DISTRIBUTOR FOR CONVEYERS
Filed April 13, 1939  2 Sheets-Sheet 2
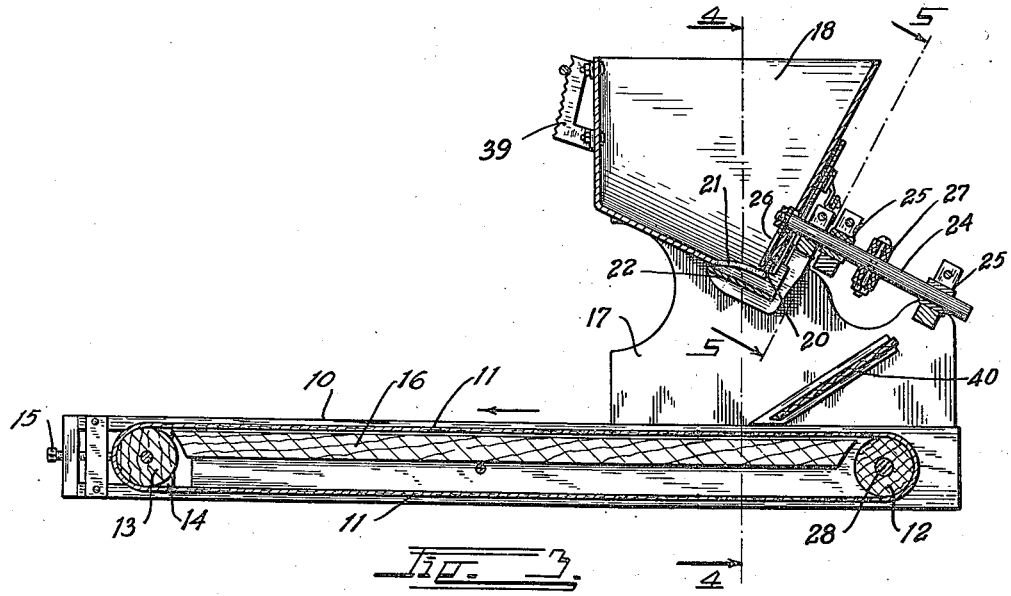
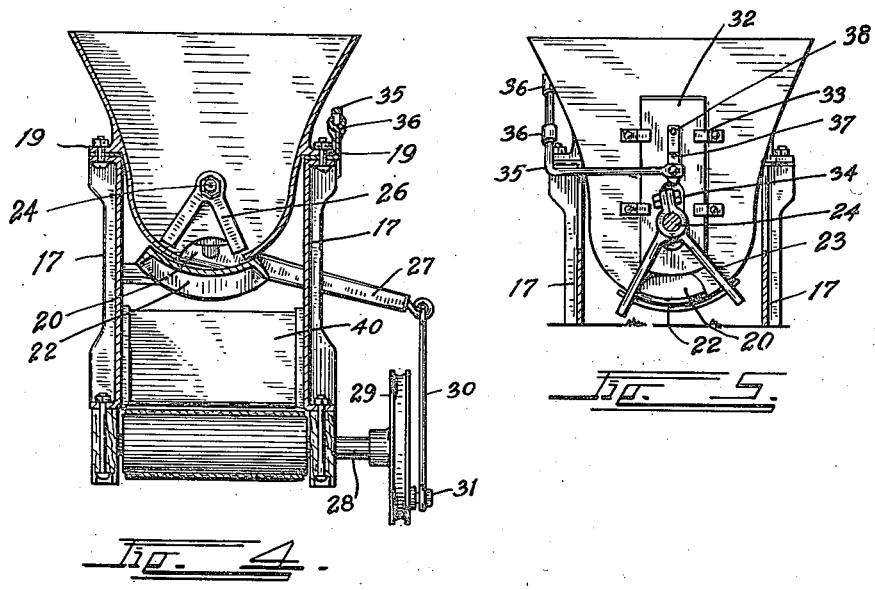
INVENTOR.
WILLIAM D. BALCOM.
BY
ATTORNEY.

Patented May 27, 1941

2,243,665

UNITED STATES PATENT OFFICE 2,243,665

FEEDER AND DISTRIBUTOR FOR CONVEYERS

William D. Balcom, Greeley, Colo.

Application April 13, 1939, Serial No. 267,587

4 Claims. (Cl. 221—118)

This invention relates to a feeder and distributor for conveyers and is more particularly designed for feeding and distributing beans on a picking conveyer.

In seed houses and the like, the beans are hand picked to eliminate all inferior beans so as to produce a high quality seed product. This picking is usually done by women sitting before belt conveyers which carry the beans before them.

The principal object of this invention is to provide a device for this purpose which will distribute the beans evenly and uniformly over the entire width of the conveyer.

Another object of the invention is to so construct the device that the rate of flow of the beans can be instantly and minutely controlled by the picker, and to provide a device in which the number of wearing parts will be reduced to a minimum so as to produce a highly efficient, long-lived machine.

While the invention is particularly valuable for and will be herein described as applied to bean picking, it is, of course, not limited to this particular use but will be valuable wherever it is desired to uniformly feed and evenly distribute any product upon a conveyer belt.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 3 is a longitudinal section through the device and its conveyer, taken on the line 3—3, Fig. 2.

Fig. 4 is a cross section taken on the line 4—4, Fig. 3.

Fig. 5 is a detail section taken on the line 5—5, Fig. 3.

Figure 1:
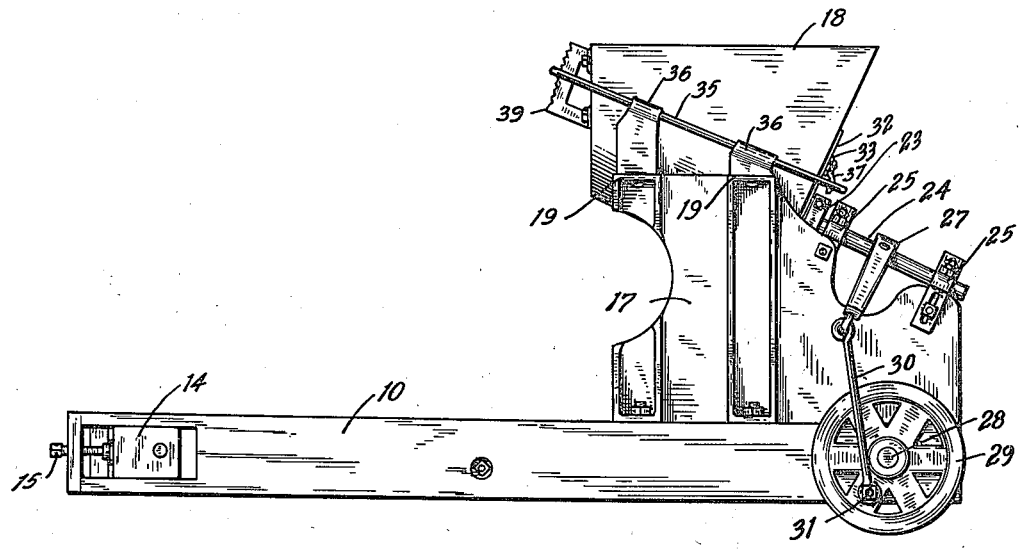
Fig. 1 is a side elevation of the improved feeding and distributing device applied to a typical bean picking conveyer belt.
Figure 2:
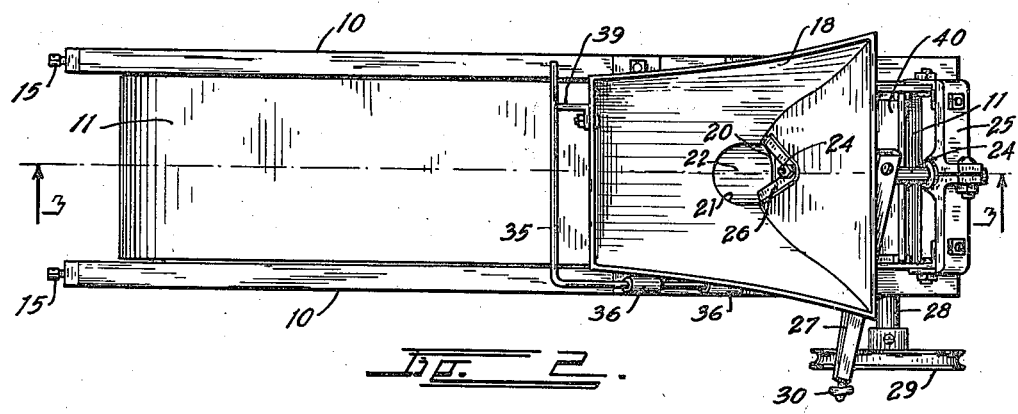
Fig. 2 is a plan view thereof.

The invention is illustrated supported upon a typical bean picking conveyer consisting of a pair of side rails 10 between which an endless conveyer belt 11 travels. The conveyer belt 11 is trained over a drive roller 12 and an idler roller 13. The latter roller is mounted in sliding journal blocks 14 actuated by means of screws 15 to adjust the tension in the belt 11. The drive roller 12 is mounted on a drive shaft 28 which extends through one of the side rails 10 to a drive pulley 29 by means of which the entire device is driven. A bottom board 16 is placed below the belt to assist in supporting the weight thereon.

The improved feeder and distributor is supported on two side frame members 17 supporting a hopper 18 through the medium of side flanges 19. The bottom of the hopper 18 is semi-cylindrical and is inclined toward a discharge opening 20 formed in the lower end wall of the hopper. The bottom of the hopper ahead of the opening 20 is cut away as shown at 21.

The cut-away portion of the bottom 21 is closed by means of a curvated scattering plate 22 having a contour corresponding to the outer contour of the semi-cylindrical hopper bottom. The scattering plate 22 is carried on bracket arms 23 from an inclined oscillating shaft 24. The shaft 24 is journalled in a pair of cross bars 25 supported from the side frames 17. The upper extremity of the shaft 24 extends through the lower end wall of the hopper and terminates in an inverted V-shaped agitator 26.

An operating lever 27 is mounted on the shaft 24 and extends to one side of the side frame 17. A connecting rod 30 is universally hinged on the extremity of the lever 27 and connects the latter with a crank pin 31 on the pulley 29.

The discharge opening 20 is controlled by means of a valve plate 32 slidably mounted in guides 33 on the end wall of the hopper. The plate 32 contains an elongated opening 34 to allow it to be raised and lowered about the shaft 24 so that its lower extremity may control the opening of the discharge. An inclined distributing board 40 is placed immediately below the discharge opening 20, supported between the side frame members 17. The latter board is preferably formed of wood.

The plate 32 is raised and lowered by means of a U-shaped control rod 35 which is mounted in inclined bearing brackets 36 at one side of the hopper. The rear extremity of the rod 35 is connected to a hinged link member 37 which is pivoted on the valve plate 32 by means of a suitable pivot pin 38. The forward extremity of the rod 35 is constantly urged against a notched bar 39, mounted on the front wall of the hopper 18, by the natural resiliency of the rod. The forward extremity can be raised and lowered with the bar snapping over the notches, to raise and lower the valve plate 32.

Let us assume that the hopper 18 is full of beans and that the drive pulley 29 is being driven through the medium of a suitable belt, not shown, in a direction to cause the upper reach of the belt 11 to travel away from the distributor. The rotation of the pulley 29 acts through the connecting rod 30 to impart a reciprocatory motion to the operating lever 27 causing it to oscillate the shaft 24. This oscillation is imparted to the scattering plate causing it to swing back and forth beneath the opening 21. This swinging rolls and agitates the beans at the lower corner of the hopper to free them so that they may travel by gravity toward the discharge opening 20. The oscillation also causes the agitator 26 to loosen the beans against the end wall so that they may flow freely to the plate 22 and thence through the discharge opening 20.

It will be noted that the plate 22 extends downwardly and rearwardly beyond the end wall so that the discharging beans are still upon the plate after they have left the hopper. This allows the plate to impart a swinging or scattering action to the beans which distributes them outwardly in a fan-shaped path. The beans fall from the plate 22 against the distributing board 40 from which they bounce at various angles, confined between side plates 17, so that they will come to rest evenly distributed over the belt 11. The board 40 being of wood will not damage the beans and it will have a resiliency to impart a rebound to the beans.

Should the beans be flowing too rapidly, the operator pushes the forward extremity of the control rod 35 downwardly over the notches in the notched member 39 until the desired rate of flow is attained.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A feeder and distributor for conveyers comprising: a hopper; a semi-cylindrical, inclined bottom in said hopper, said bottom being open adjacent its lower extremity; an end wall in said hopper closing the lower extremity of said bottom and provided with a discharge passage in its lower edge; a curved plate closing the opening in said bottom, said latter plate and said bottom being curved about a common inclined longitudinal axis; means for hingedly supporting said plate at said axis so that it may swing on the arc of said bottom below the opening therein so as to impel material toward said discharge passage; and means for swinging said plate.

2. A feeder and distributor for conveyers comprising: a hopper; a semi-cylindrical, inclined bottom in said hopper, said bottom being open adjacent its lower extremity; an end wall in said hopper closing the lower extremity of said bottom and provided with a discharge passage in its lower edge; a curved plate closing the opening in said bottom; a shaft rotatably supported in axial alignment with said cylindrical bottom extending through and beyond said end wall; bracket members for supporting said plate from said shaft; and means for oscillating said shaft so as to cause said plate to reciprocate beneath said bottom opening.

3. A feeder and distributor for conveyers comprising: a hopper; a semi-cylindrical, inclined bottom in said hopper, said bottom being open adjacent its lower extremity; an end wall in said hopper closing the lower extremity of said bottom and provided with a discharge passage in its lower edge; a curved plate closing the opening in said bottom; a shaft rotatably supported in axial alignment with said cylindrical bottom and beyond said end wall; bracket members for supporting said plate from said shaft; and means for oscillating said shaft so as to cause said plate to reciprocate beneath said bottom opening, said shaft extending through said end wall; and an agitating member mounted on said shaft within said hopper.

4. A feeder and distributor for conveyers comprising: a hopper; a semi-cylindrical, inclined bottom in said hopper, said bottom being open adjacent its lower extremity; an end wall in said hopper closing the lower extremity of said bottom and provided with a discharge passage in its lower edge; a curved plate closing the opening in said bottom, said latter plate and said bottom being curved about a common inclined longitudinal axis; a shaft for hingedly supporting said plate at said axis so that it may swing concentrically about the arc of said bottom below the opening therein so as to impel material toward said discharge passage, said plate extending outwardly and downwardly beyond said end wall to support material passed through said opening; and means for imparting a reciprocating rotation to said shaft to impart a scattering motion to said material.

WILLIAM D. BALCOM.